(12) United States Patent
Leconte et al.

(10) Patent No.: US 9,674,169 B2
(45) Date of Patent: Jun. 6, 2017

(54) METHOD AND SYSTEM FOR WRITING, UPDATING AND READING STATIC AND DYNAMIC IDENTIFICATION DATA FOR AN AERONAUTICAL APPLIANCE

(71) Applicant: Airbus Operations (S.A.S.), Toulouse (FR)

(72) Inventors: Bertrand Leconte, Toulouse (FR); Thierry Planche, Vieille-Toulouse (FR); Bertrand Deleris, Seysses (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 2 days.

(21) Appl. No.: 14/249,835

(22) Filed: Apr. 10, 2014

(65) Prior Publication Data

US 2015/0121458 A1 Apr. 30, 2015

(30) Foreign Application Priority Data

Apr. 11, 2013 (FR) ...................................... 13 53284

(51) Int. Cl.
| | |
|---|---|
| *H04L 29/06* | (2006.01) |
| *H04L 29/08* | (2006.01) |
| *G06F 21/60* | (2013.01) |
| *G06Q 10/06* | (2012.01) |
| *H01Q 1/22* | (2006.01) |

(52) U.S. Cl.
CPC .............. *H04L 63/08* (2013.01); *G06F 21/60* (2013.01); *G06Q 10/06* (2013.01); *H04L 67/125* (2013.01); *H01Q 1/2216* (2013.01)

(58) Field of Classification Search
CPC ....... H04L 63/08; H04L 67/125; G06F 21/60; G06F 13/1605; G06F 13/18; H01Q 1/2216; G06Q 10/06
See application file for complete search history.

(56) References Cited

U.S. PATENT DOCUMENTS

| | | |
|---|---|---|
| 7,545,274 B2 | 6/2009 | Coop |
| 8,212,673 B1 | 7/2012 | Whittaker |

(Continued)

OTHER PUBLICATIONS

Hutter, Michael, et al., "RFID and its Vulnerability to Faults," 10th International Workshop, Washington, D.C., USA, Aug. 10-13, 2008, 17 pages.*

(Continued)

*Primary Examiner* — Eleni Shiferaw
*Assistant Examiner* — Alexander Lapian
(74) *Attorney, Agent, or Firm* — Jenkins, Wilson, Taylor & Hunt, P.A.

(57) ABSTRACT

A system and method for writing, updating and reading the static and dynamic identification data for an aeronautical appliance, which is secure, of low weight and simple to implement. The system for writing, updating and reading the static and dynamic identification data includes a data collection device for collecting and storing static and dynamic identification data for an aeronautical appliance, the collection device integrated into the aeronautical appliance and coupled to a computing unit of the aeronautical appliance according to a master-slave communication model, the computing unit always being master of the communication with the collection device, and a reading device for remotely reading at least part of the identification data stored on the collection device.

16 Claims, 2 Drawing Sheets

(56) References Cited

U.S. PATENT DOCUMENTS

| | | | | |
|---|---|---|---|---|
| 8,879,985 B2* | 11/2014 | Ochikubo | ............ | G06F 13/1605 340/10.1 |
| 2003/0152086 A1* | 8/2003 | El Batt | ............. | H04W 74/0816 370/400 |
| 2006/0164246 A1* | 7/2006 | Ghosh | ........................ | 340/572.1 |
| 2008/0006696 A1* | 1/2008 | Piersol | ............. | G06K 19/07381 235/451 |
| 2008/0129459 A1* | 6/2008 | Bailly et al. | ................. | 340/10.1 |
| 2009/0327783 A1* | 12/2009 | Doss | ................. | H02M 3/33515 713/340 |
| 2010/0085154 A1* | 4/2010 | Park et al. | ................... | 340/5.85 |
| 2011/0263297 A1* | 10/2011 | Kaaja | ................ | G06K 7/10009 455/566 |

OTHER PUBLICATIONS

French Search Report for Application No. FR 1353284, dated Dec. 5, 2013.

* cited by examiner

METHOD AND SYSTEM FOR WRITING, UPDATING AND READING STATIC AND DYNAMIC IDENTIFICATION DATA FOR AN AERONAUTICAL APPLIANCE

CROSS-REFERENCE TO RELATED APPLICATION

This application claims priority to French Patent Application No. 13 53284 filed on Apr. 11, 2013, the entire content of which is incorporated by reference herein.

DESCRIPTION

Technical Field

The present invention relates to the identification of an aeronautical appliance including a computing unit, and more particularly, the writing, the updating and the reading of the static and dynamic identification data for the aeronautical appliance and, in particular, for its computing unit.

Background

Modern aircraft are comprising more and more electronic and computing systems to improve their performance and assist the pilot and the crew members during their missions. The functionalities of avionics systems make the greatest possible use of computational and input/output resources of the aeronautical appliances in which they are implemented.

Each aeronautical appliance complies with a technical definition, indicated by an appliance number (HardWare Part Number or Original Part Number PNO) specific to this definition. Moreover, each appliance receives, upon its creation, an alphanumeric serial number (Serial Number, or Alphanumeric Serial Number—SEQ or SER). This unique identification number allows tracking of the life cycle of the appliance to which it is allotted. These static identification data for the appliance are generally stored on an internal memory of the appliance or offloaded, for example to an RFID (for Radio Frequency IDentification) chip (or tag), for example stuck to this appliance.

Moreover, the onboard computing architecture offers a network layer, a hardware layer formed by the assembly of processing and computation units, a low-level software layer (operating system and middleware) and an application package software layer providing avionics functions. Thus, the aeronautical appliances, be they generic or specific, may require updates of their software configuration, in order to improve their functionality or their performance, to correct anomalies, to meet new standards, etc. These updates can be carried out in the factory, by the builder of the aircraft for example, or in the aircraft, by the airline for example and are identified by dynamic identification data which are generally software version numbers (SoftWare Part numbers).

According to a first procedure for updating the software configuration, the aeronautical appliance remains mounted on the aircraft, and it receives the update through its nominal avionics communication network (AFDX and its variants, local Ethernet, CAN, A429, I2C or any other media used in aeronautics), from an onboard system for downloading configuration data DLCS (for Data Loading Configuration System). The aeronautical appliance installs this downloaded update in the memory area provided for this purpose and updates its software configuration data (SW Part Numbers) according to the update downloaded. These software configuration data consist of an exhaustive list of all the software installed on the appliance such as the operating system, the middleware, the ancillary software of the platform, also called system partitions, the avionics applications with their databases and their configuration tables.

According to a second procedure for updating the software configuration, the aeronautical appliance remains mounted on the aircraft and receives this update through a connector dedicated to maintenance (for example a JTAG, I2C, SPI, Ethernet connector, or any other media used in aeronautical maintenance), which offers the capacity to update the memory of the appliance as well as the software configuration data of the aeronautical appliance according to the updates installed. According to a third procedure for updating the software configuration, the aeronautical appliance remains mounted on the aircraft, and a removable part of the memory of the appliance (for example, OBRM, ROM) is physically replaced by the maintenance technician. The identification of the software configuration is an integral part of this memory.

Finally, the previously mentioned procedures for updating the software configuration can be used when the aeronautical appliance undergoes workshop maintenance.

During these updates of the software configuration, the dynamic identification data, such as the SW Part Numbers, are also updated. The updating can be carried out with the active collaboration of the operating system of the appliance, via an avionics medium, or directly on the various memory areas of the aeronautical appliance.

In order to access the static identification data (such as the appliance number and the identification number) of an aeronautical appliance, an RFID reader which reads the RFID chip, present on the aeronautical appliance, is currently used. This chip also makes it possible to store static data relating to certain software maintenance actions, recorded by a maintenance technician when he performs a maintenance operation. However, in the case of automatic maintenance by a communication network, or if the appliance is difficult for the maintenance technician to access, the data of the RFID chip will be incorrect or incomplete.

Current procedures for updating the software configuration of an aeronautical appliance do not make it possible to easily ascertain the state of this software configuration and to access the dynamic identification data.

A partial solution for ascertaining the dynamic identification data has been implemented in current aeronautical computers. This solution consists in using a test socket which makes it possible to connect a dedicated reader so as to read the dynamic identification data. However, this test socket penalizes the mass of the aircraft. Moreover, it requires a specific reader and does not provide any access to the static identification data for the appliance.

An object of the present invention is to remedy the aforementioned drawbacks by a method and a system for writing, updating and reading the static and dynamic identification data for an aeronautical appliance, which is automatic, secure, of low weight and simple to implement.

SUMMARY

The present invention is defined by a method of writing, updating, and reading static and dynamic identification data for an aeronautical appliance comprising a computing unit, the method comprising for example:

transmission by the aeronautical appliance to a collection device, of static and dynamic identification data for the aeronautical appliance, the collection device being integrated into the aeronautical appliance and coupled to the computing unit of the aeronautical appliance according to a master-slave communication model in which the computing unit is master of the communication with the collection device, storage of the static and dynamic identification data in a memory of the collection device, and remote reading by a reading device of at least part of the static and dynamic identification data stored in the memory of the collection device.

This method makes it possible to have access in a simple and secure manner to the static and dynamic identification data for the aeronautical appliance. More particularly, the method makes it possible to access the updates of the dynamic identification data in an automatic manner and without disturbing the aeronautical appliance when the software configurations of the appliance are updated by downloading through the communication network of the aircraft or of any other media or by any other procedure.

DETAILED DESCRIPTION

Figure 1:
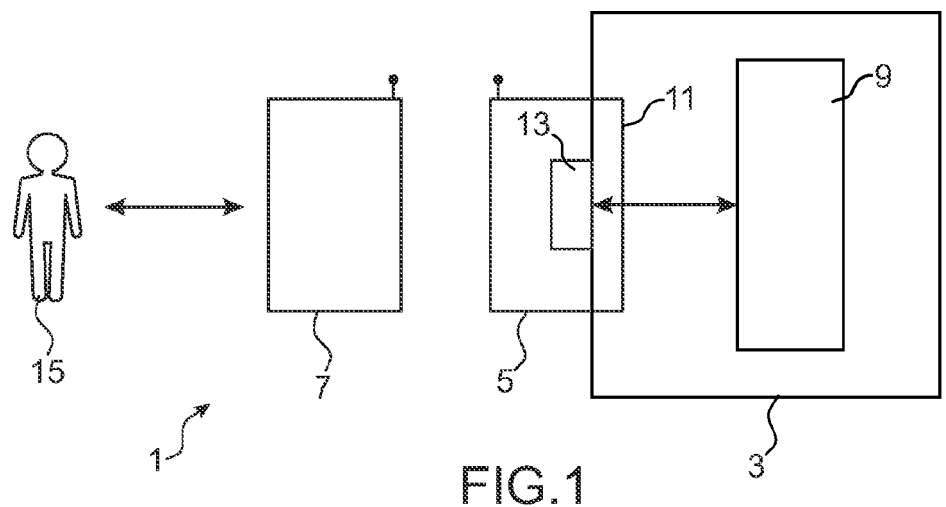
FIG. 1 illustrates in a schematic manner a system for writing, updating and reading the static and dynamic identification data for an aeronautical appliance, according to an embodiment of the invention.

According to a first embodiment, a communication with the collection device, be it initiated by the aeronautical appliance or by the reading device, is carried out in a direct manner.

This allows the aeronautical appliance and the reading device to each act on its side on the collection device in a simple and direct manner without any interference of the reading device on the aeronautical appliance.

According to a second embodiment, a communication with the collection device, be it initiated by the aeronautical appliance or by the reading device, requires a step of authenticating the initiator.

This allows the aeronautical appliance and the reading device to act on the collection device in a still more secure manner.

Advantageously, the method comprises a step of authenticating the user on the reading device.

This makes it possible to verify the access authorization and optionally, the level of the user's access entitlement according to his profile.

Advantageously, the communication between the aeronautical appliance and the collection device is one-way in a direction going from the aeronautical appliance to the collection device.

This makes it possible to guarantee yet further that nothing can reach or disturb the aeronautical appliance.

Advantageously, the method comprises a step of writing, by the reading device, of tracking data of the aeronautical appliance in the memory of the collection device.

These data make it possible to ascertain in a precise manner the log of the maintenance actions and the history of the aeronautical appliance. In particular, during a maintenance action, it will be possible for the operator to verify, before the maintenance action, the initial configuration of the aeronautical appliance, and then after the maintenance action, the final configuration of this appliance.

Advantageously, the data communicated to the collection device, be they sent by the aeronautical appliance or by the reading device, are encrypted and/or signed by the sender.

This makes it possible to improve the protection of the data and to guarantee their integrity.

Advantageously, the method comprises steps of writing and reading, by the aeronautical appliance, of ancillary data relating to the life cycle of the aeronautical appliance in the memory of the collection device.

Indeed, in addition to the static and dynamic identifications (HW Part Number, Serial Number, SW Part Numbers), and to the tracking information on the maintenance of the aeronautical appliance, the equipment manufacturer, the aircraft manufacturer or the airline may desire to collect and then archive in the collection device information on the life cycle (such as for example the number of operating hours or the extreme values of the temperatures and supply voltages) of each appliance that it has respectively delivered, installed in the aircraft, or implemented during operational utilization, and in particular outside of any maintenance activity. These data (such as the maximum values of the temperatures and supply voltages, or the number of takeoff/landing cycles) make it possible to facilitate investigation on the aeronautical appliance subsequent for example to an operating anomaly (curative maintenance) or to establish a prognosis making it possible to anticipate a future failure of the appliance (preventive maintenance). The aeronautical appliance can read the memory of the collection device, in particular so as to avoid it having to store the ancillary data whose minima and maxima it must establish, or to allow it to compute aggregate durations.

The invention is also aimed at a system for writing, updating, and reading static and dynamic identification data for an aeronautical appliance comprising a computing unit, the system comprising:

a data collection device integrated into the aeronautical appliance and coupled to the computing unit of the aeronautical appliance according to a master-slave communication model in which the computing unit is master of the communication with the collection device, the collection device being configured to collect and store static and dynamic identification data, and a reading device for remotely reading at least part of the identification data stored on the collection device.

The invention is also aimed at a data collection device intended to be integrated into an aeronautical appliance comprising a computing unit, the device comprising:

an isolation interface intended to be coupled to the computing unit of the aeronautical appliance so as to isolate any connection between the aeronautical appliance and the collection device from any exterior intrusion, first sender-receiver modules configured to communicate remotely with a reading device, a supervision unit configured to receive requests sent by the reading device via the first sender-receiver modules or by the aeronautical appliance via the isolation interface, so as to manage accesses to the collection device by the reading device or the aeronautical appliance, and to ensure that the collection device cannot access the aeronautical appliance, an execution unit configured to execute the access requests originating from the supervision unit, and a memory accessible by the execution unit and configured to store static and dynamic identification data for the aeronautical appliance.

The architecture of the collection device makes it possible to collect the identification data for the aeronautical appliance in a simple and secure manner while blocking any intrusion against the latter.

Advantageously, the collection device comprises an isolation interface configured to isolate any connection between the aeronautical appliance and the collection device from any exterior intrusion.

The isolation interface allows security against any accidental or malicious electrical and/or electromagnetic intrusion or interaction. Thus, the aeronautical appliance and its operational performance cannot be degraded or falsified by computing manipulations or electrical manipulations.

Advantageously, the collection device comprises a complementary computation unit configured to authenticate the requests of a user of the reading device and/or to encode data to be read and/or to be written in the memory.

Advantageously, the collection device comprises energy management modules configured to power the various elements of the collection device either on the basis of energy transmitted by the reading device when the latter performs an access, or else on the basis of a power supply source provided by the aeronautical appliance when the latter performs an access.

The invention is also aimed at an aeronautical appliance comprising a computing unit, as well as mechanical, electrical and communication interfaces for receiving a collection device according to the characteristics hereinabove.

The invention is also aimed at a reading device for remotely reading data stored on a collection device, comprising:

a user interface to allow a user to access part of the data stored on the collection device according to the profile of the user, second sender-receiver modules configured to communicate remotely with the collection device, a control unit configured to send requests to the collection device via the second sender-receiver modules and to manage the data received from the collection device, a storage unit configured to store data received from the collection device, and power supply and energy management modules configured to power the various elements of the reading device and to transmit energy to the collection device.

The invention is also aimed at an aircraft comprising an aeronautical appliance according to the characteristics hereinabove.

The principle of the invention is to connect an electronic chip to the computing unit of an aeronautical appliance according to an architecture guaranteeing total mastery of the communications by the aeronautical appliance so as to write or update identification data on the chip which can thereafter be read by a suitable reader.

FIG. 1 illustrates in a schematic manner a system for writing, updating and reading the static and dynamic identification data for an aeronautical appliance, according to an embodiment of the invention. The identification system 1 for an aeronautical appliance 3 comprises a data collection device 5 integrated into the aeronautical appliance 3, and a reading device 7.

The aeronautical appliance 3 is for example an avionics appliance for radiocommunication, geolocation, maintenance, or any other onboard appliance comprising a computing unit 9, such as a computer.

The aeronautical appliance 3 comprises mechanical, electrical and communication interfaces 11 to receive the collection device 5 which is configured to receive, collect and store static and dynamic identification data for the aeronautical appliance 3.

The mechanical interface makes it possible to fix, for example by gluing, the collection device 5 to the aeronautical appliance 3 and as regards the electrical interface, it allows the collection device 5 to be supplied with electrical voltage by the aeronautical appliance 3. The communication interface makes it possible to couple the collection device 5 to the computing unit 9 of the aeronautical appliance 3 according to a master-slave communication model or architecture where the computing unit 9 of the aeronautical appliance 3 is master of the communication with the collection device 5 which is itself configured to be controlled by the computing unit 9.

The aeronautical appliance 3 is thus a host appliance which integrates or accommodates the collection device 5 and the computing unit 9 of this appliance can write or update, in complete security, identification data and optionally other data on the collection device 5.

The static identification data (HardWare Part Number, Serial number) relate in general to the hardware technical definition of the appliance 3, that may include its operating system, as well as its serial number. The dynamic identification data (SoftWare Part Numbers) relate in general to the software configuration of the appliance, including the avionics applications, their databases and their configuration tables, the middleware and the operating system, updated throughout the life of the appliance 3 from the production unit up to the decommissioning unit.

Advantageously, the collection device 5 is an active component in the form of a tag or chip of very low weight comprising a device for sending and receiving data, RFID (Radio-Frequency IDentification) tag type, comprising, moreover, an isolation interface 13 configured to isolate the aeronautical appliance 3 from any electrical, electromagnetic, or communication connection via the collection device 5 originating from a device outside the appliance 3. This affords security against any accidental or malicious intrusion. Thus, no computing or electrical manipulation of the system 1 can degrade the operational performance of the appliance or falsify the data relating to the appliance.

The reading device 7 is configured to read remotely by radiofrequency at least part of the identification data stored on the collection device 5. The reading device 7 can be used by a user 15 to read the data according to the profile of the user (for example, maintenance operator, airline, computing administrator, etc.).

As a variant, the reading device 7 is configured to read remotely by radiofrequency identification data stored on the collection device 5 and also to write information relating to the aeronautical appliance on the collection device 5 in the case where the latter is configured to allow access in write mode to the reading device 7.

Figure 2:
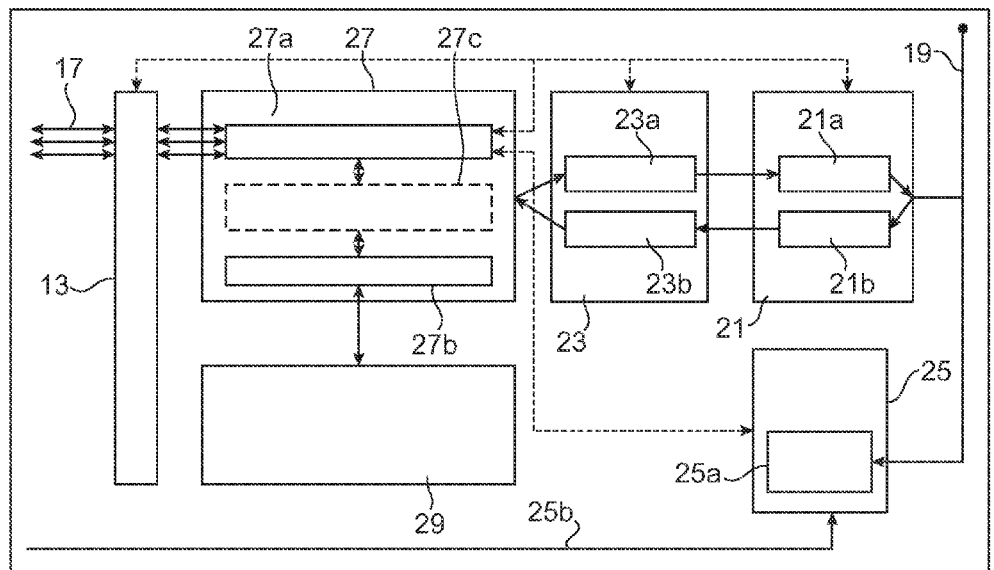
FIG. 2 illustrates in a schematic manner a device for collecting the static and dynamic data, according to a preferred embodiment of the invention.

FIG. 2 illustrates in a schematic manner a collection device, according to a preferred embodiment of the invention.

According to this preferred embodiment, the collection device 5 takes the form of a radio-identification electronic chip, RFID tag type. The collection device 5 integrates a secure electronic linkup 17 connected to the computing unit 9 of the aeronautical appliance 3 (or host appliance) accommodating the collection device. The secure linkup 17 can for example take the form of a data bus, of discrete signals, or of an electro-optical or electromagnetic coupling.

The hardware architecture of the collection device 5 comprises first sender-receiver modules 19, 21, 23, energy management modules 25, an isolation interface 13, a processing module 27, and a memory 29.

The first sender-receiver modules 19, 21, 23 comply with the aeronautical specifications for communicating remotely with a reading device 7. More particularly, these modules comprise an RF (radiofrequency) antenna 19, a modem 21 and a codec 23 which are capable of receiving/of sending information from/to the reading device 7. The modem 21 comprises in a customary manner a modulator 21a and a demodulator 21b. The modulator 21a is adapted for converting a stream of data into a modulated signal so as to transmit it to the reading device 7 via the antenna 19. The demodulator 21b is adapted for converting a signal received from the reading device 7 into a stream of data. The codec 23 comprises an encoder 23a for encoding the data intended for transmission and a decoder 23b for decoding the stream of data originating from the modem 21.

The energy management modules 25 are configured to power the various elements of the collection device 5 on the basis of the external sources via an energy harvesting process 25a or via an electrical link 25b. Indeed, the collection device 5 can be supplied either on the basis of energy transmitted by the reading device 7 when the latter performs an access (read or write), or else on the basis of a power supply source provided via an electrical link 25b by the aeronautical appliance 3 when the latter performs an access (read or write).

The isolation interface 13 (comprising for example optocouplers) is intended to be coupled via the secure bus 17 to the computing unit 9 of the aeronautical appliance 3 so as to isolate any connection between the aeronautical appliance 3 and the collection device 5 from any exterior intrusion. This ensures electrical protection of the aeronautical appliance 3 by preventing any electrical disturbance, originating from the collection device 5, from being propagated to the host appliance 3.

Furthermore, according to a particular embodiment corresponding to a mode of one-way communication, the isolation interface 13 is configured to block any communication in the direction going from the collection device 5 to the aeronautical appliance 3.

The isolation interface 13 is connected to the processing module 27 which comprises a supervision unit 27a, an execution unit 27b, and optionally, a complementary computation unit 27c. It will be noted that the processing module 27 and its connection to the computing unit 9 of the aeronautical appliance 3 via the isolation interface 13 and the secure bus 17 are effected according to a master-slave architecture where the computing unit 9 is the master.

The supervision unit (or monitoring unit) 27a is configured to supervise the elements of the collection device 5 as well as to receive and manage the requests sent by the reading device 7 via the first sender-receiver modules 19, 21, 23 or by the aeronautical appliance 3 via the isolation interface 13. These requests take the form of a request for reading or writing in the memory 29 of the collection device 5. Each request can be partnered with an unfalsifiable indication of authentication. An acknowledgement is advantageously sent in response to each request, in particular to confirm the authentication.

The supervision unit 27a exercises supervision via supervision links (dotted linkups) on all the elements of the collection device 5 so as to, for example, activate or deactivate certain functions so as to allow or to prohibit write-access and/or read-access to the collection device 5.

For example, according to a first embodiment, the supervision unit 27a is configured to allow the reading device 7 to read only at least part of the data which are recorded on the collection device 5. According to this first mode, the collection device 5 is said to be of "read only" type.

According to a second embodiment, the supervision unit 27a is configured to allow the reading device 7 to read at least part of the data which are recorded on the collection device 5 but also to write information on the collection device. According to this second mode, the collection device 5 is said to be of "read and write" type.

In particular, the supervision unit 27a is configured to manage accesses to the collection device 5 by the reading device 7 or the aeronautical appliance 3. For example, the supervision unit 27a manages the possible conflicts between simultaneous attempts to access the collection device 5 by the reading device 7 on the one hand, and by the computing unit 9 of the aeronautical appliance 3, on the other hand. The access priorities during these conflicts are configurable by advantageously giving priority to the aeronautical appliance. The supervision unit 27a can thus deactivate the energy harvesting function 25a and the first sender-receiver means 19, 21, 23 during priority accesses of the aeronautical appliance 3. Likewise, the supervision unit 27a controls the isolation interface 13 so as to completely isolate the aeronautical appliance 3 from any intrusion during access or attempted access to the collection device 5. Moreover, during an updating of the software configuration of the aeronautical appliance 3 by downloading via the communication network of the aircraft or via a specific loading socket, the supervision unit 27a is advantageously configured to disable or bar access to the collection device 5 by the reading device 7 in read-mode and write-mode, so as to guard against any eventuality of inconsistency of data in the memory 29 of the collection device 5. This disabling can feature in the acknowledgement sent by the collection device 5 for the benefit of the reading device 7.

The supervision unit 27a is also configured to ensure that the collection device 5 can neither read-access nor write-access the memories or registers of the aeronautical appliance 3. Thus, the collection device 5 cannot modify an arbitrary state of the aeronautical appliance 3.

Furthermore, the supervision unit 27a is configured to use another optional computation resource making it possible for example to authenticate the requests of the users and/or to encode the data to be read and/or to be written. Indeed, the processing module 27 can comprise a complementary computation unit 27c that can be configured and activated during any access to the data of the collection device 5. This complementary computation unit 27c corresponds to a coprocessor adapted for carrying out authentication and/or encryption operations to authenticate the requests of a user 15 of the reading device 7 and/or to encode data to be read and/or to be written in the memory 29. Preferably, the complementary computation unit 27c is activated provided that it is included in the collection device 5.

According to a variant embodiment, the supervision unit 27a is also configured to transmit the data that may optionally include an integrity element (or signature) to the execution unit 27b.

The execution unit 27b is configured to receive and execute the authorized access requests from the supervision unit 27a to the memory 29.

Finally, the memory (ROM/RAM) 29 is configured to be accessible by the execution unit 27b and to store identification data as well as other types of data of the aeronautical appliance 3.

The implementation of the collection device 5 can be effected in various phases or steps. During an initial step corresponding to the design of the aeronautical appliance 3, the mechanical, electrical and computer interfaces 11 for receiving the collection device are envisaged, and all the secure electrical, electromagnetic and computer linkups are designed and validated right from the design so as to prohibit any electrical and/or electromagnetic and/or computer intrusion, accidental or intentional, via these secure linkups.

Furthermore, during the manufacture of the aeronautical appliance 3, the collection device 5 is connected to the computing unit 9 of this host appliance 3, and the static identification data (Part/Number and Serial/Number) which are specific to this appliance 3 are written in the memory of the collection device 5.

Thereafter, during the initial integration or the updating of the software elements (including the operating system, the middleware, the applications, the configuration tables, the databases) in the aeronautical appliance 3, whatever the means by which these elements are received, the dynamic identification data (SW P/N) are written or updated in the collection device 5 by the aeronautical appliance 3 in an automatic and non-corruptible manner.

During the operational use of the aeronautical appliance 3, and during the maintenance phases, ancillary data of the life cycle of the aeronautical appliance 3 can be written in the collection device 5 by the aeronautical appliance 3. Indeed, the protocol for communication with the computing unit 9 of the aeronautical appliance 3 is configured to allow the collection device 5 to receive the host appliance 3 software configuration identification data, but also the ancillary data which are not accessible to the collection device 5.

The ancillary data can comprise, by way of indication and without restriction, the following data: number of hours powered-up; number of flying hours; number of takeoff/landing cycles; minimum/maximum operating temperatures; minimum/maximum supply voltages and currents; number of hot swaps; number of cycles of writing to the read-only memory; number of downloads; number of reboots (resets) caused by an anomaly of the appliance; number of reboots (resets) requested by the pilot or by a maintenance operator; operating data specific to the aeronautical appliance (defects on the communication buses, overvoltages applied to the inputs/outputs, results of internal surveillance, etc.); and first and last anomaly messages relating to the aeronautical appliance.

Advantageously, the collection device can compute and store in its memory the minima and the maxima of these ancillary data or the aggregated durations of operation or any other variable necessary for the servicing of the aeronautical appliance.

Advantageously, the aeronautical appliance 3 is authorized by the collection device 5 to read in the memory 29 of the collection device 5. Thus, the ancillary data are not stored in the collection device and the performance of the latter is improved.

Figure 3:
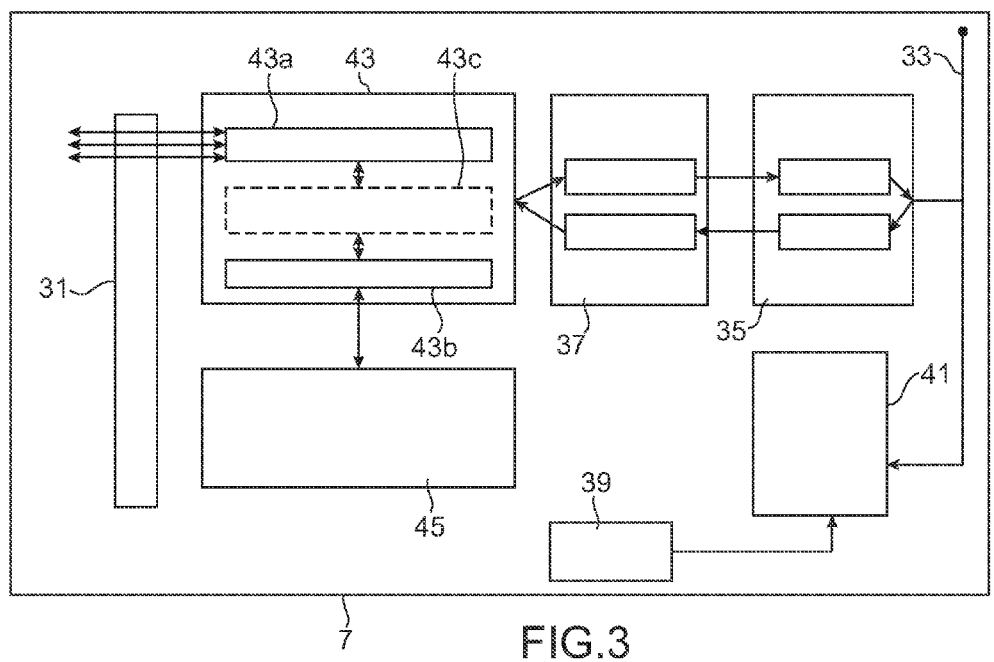
FIG. 3 illustrates in a schematic manner a device for reading the static and dynamic data, according to a preferred embodiment of the invention.

FIG. 3 illustrates in a schematic manner a reading device, according to a preferred embodiment of the invention. The energy distribution and basic protocols of the reading device 7 comply with aeronautical standards.

The hardware architecture of the reading device 7 comprises a user interface 31, second sender-receiver modules 33, 35, 37, power supply and energy management modules 39 and 41, a control module 43, and a data storage unit (or memory) 45.

The user interface 31 is configured to allow a user 15 to access part of the data stored on the collection device 5 according to the user's profile and in particular his access and/or reading and/or writing entitlements.

The second sender-receiver modules 33, 35, 37 comply with the aeronautical specifications for communicating remotely by radiofrequency with a collection device according to FIG. 2. These modules comprise an RF antenna 33, a modem 35 and a codec 37 which are capable of receiving/of sending information from/to the collection device 5.

The power supply and energy management modules 39 and 41 comply with aeronautical standards and are configured to power the various elements of the reading device 7 as well as to transmit energy via the antenna 33 to the collection device 5.

The control module 43 is configured to send requests to the collection device 5 via the second sender-receiver modules 33, 35, 37 and to manage the data received from the collection device 5.

More particularly, the control module 43 comprises a supervision means 43a, an execution means 43b, and optionally, a complementary computation means 43c. These means have functions equivalent to the units 27a, 27b, 27c of the collection device 5.

The complementary computation means 43c is configured to for example verify the identity of the user so as to authenticate the latter.

Furthermore, the complementary computation means 43c is configured to transmit to the collection device 5 the identity presented by the user 15 for authentication/verification of the entitlements, thus making it possible to authorize the communication with the collection device 5.

According to another option, the complementary computation means 43c is configured to compute an integrity element by using the identity of the user 15 or the identity specific to the reading device 7.

The complementary computation means 43c can also be configured to verify an integrity element read in the collection device 5. It will be noted that the latter integrity element is not necessarily the same as that computed by the reading device 7.

According to yet another option, the complementary computation means 43c is configured to encrypt and decrypt the data dispatched to the collection device 5 with the identity of the user 15 or with the identity specific to the reading device 7.

Moreover, the control module 43 is configured to supervise and manage the security of access to the data of the collection device 5 as a function of the privilege allocated to the user 15 of the reading device 7, and optionally of the capacity to write in the memory 29 of the collection device 5 when the latter is of read and write type.

The control module 43 is factory configurable and in particular in respect of the functions for recognizing and authenticating the user 15 of the reading device 7. Thus, specific entitlements of access to the memory 29 of the collection device 5 can be allocated as a function of users' profiles. By way of example, the profiles of users can comprise by way of indication the following profiles: aeronautical appliance supplier, integrator of the avionics bay or of the cabinet, aeronautical builder, airline (purchasing or maintenance department), line maintenance technician, maintenance workshop, and host appliance.

To each user profile, and if need be to each pre-identified user of a given profile, is assigned an entitlement to access certain parts of the memory 29 of the collection device 5, in read and/or write mode. For example, only the supplier of the aeronautical appliance has the privilege to write just once the serial number (HW Serial Part Number) before the delivery of the latter. All the users will subsequently be able to read this number, but no user, even the supplier of the appliance 3, can modify it or destroy it.

Moreover, the reading device 7 can be configured according to several modes of use. According to a first mode of use, the reading device 7 is standard and common to all users. In this case, before each use, each user provides the reading device with a code which is specific to him and affords him access to certain privileges of read and/or write access to the memory 29 of the collection device 5.

According to a second mode of use, the reading device 7 is basic and there is no verification of the authorization of access by the reading device to the collection device. Thus, the reading device 7 can always read the data contained in the collection device 5. According to a variant embodiment, when the collection device 5 is of read-write type, the reading device is also always capable of writing to the collection device 5.

According to a third mode of use, the reading device 7 is configured specifically for a given user 15 and the latter can then use it without constraint of authentication and/or verification of his access and/or write and/or read entitlements.

Advantageously, the reading device 7 is supplemented with a software application on a work station of PC or equivalent type making it possible to distribute the data acquired by this reader to a company computing architecture. The entitlements of access to the data of the collection device 5 can be verified during radiofrequency connection between the collection device 5 and the reading device 7; it is then not necessary for the data distribution software to be secure or for it to take account of the data access authorizations. It is also possible that the entitlements of access to the data of the collection device 5 are managed by the software application on the work station.

Figure 4:
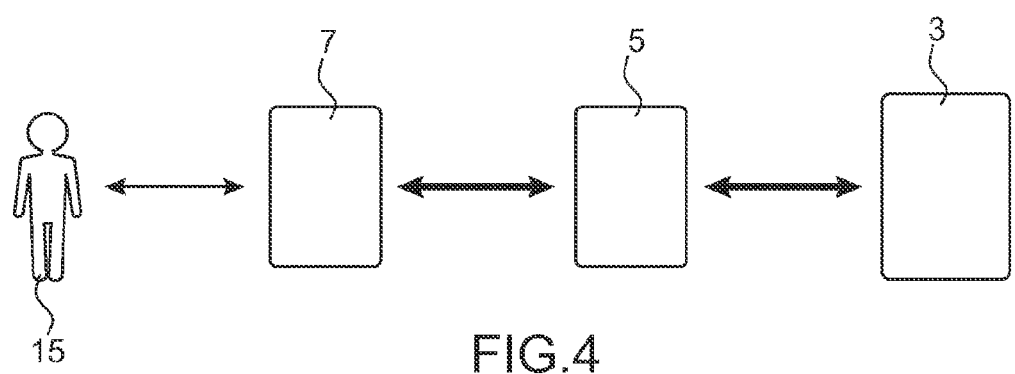
FIG. 4 illustrates in a schematic manner a method of writing, updating and reading the static and dynamic identification data for an aeronautical appliance, according to preferred embodiments of the invention.

FIG. 4 illustrates in a schematic manner a method for identifying an aeronautical appliance, according to preferred embodiments of the invention.

This method illustrates the interaction between the collection device 5 and the aeronautical appliance 3 on the one hand, and between the collection device 5 and the reading device 7 on the other hand. As indicated previously, the collection device 5 is integrated into the aeronautical appliance 3 and coupled to the computing unit 9 of this appliance according to a communication model mastered by the computing unit 9.

According to a first step, the collection device 5 receives from the aeronautical appliance 3 through the secure interface 17 the identification data (HW Part Number, Serial Number, SW Part Numbers) and in particular the information for updating these identification data. The data originating from the aeronautical appliance 3 can also comprise information on the life cycle of the appliance 3.

The data originating from the aeronautical appliance 3 may or may not all be authenticated. Furthermore, the aeronautical appliance 3 can include an integrity element to be written with the data. This integrity element is based on an element for identifying the aeronautical appliance 3, making it possible to be certain of the identity thereof. Moreover, the data can be encrypted by the aeronautical appliance 3 before dispatch to the collection device 5.

The second step relates to the storage or the writing of the identification data in the memory 29 included in the collection device 5 with an accreditation of the data source in the case where they are authenticated. The data stored in the memory 29 can be coded and/or encrypted so as to improve the protection of these data, and can be signed to guarantee their integrity.

The third step relates to the reading by the reading device 7 of at least part of the identification data stored in the memory 29 of the collection device 5. This step can comprise an authentication of the user 15 and optionally, a verification (by the collection device 5 or the reading device 7) of his entitlement to read. This step can also comprise a verification of the initial writer's write entitlement by using the integrity element. Furthermore, the step can also comprise a read with decoding/decryption of the data.

Optionally, the method can comprise a step of writing data by the reading device 7 (which in this case is also a writing device) in the collection device 5, when the latter is of read-write type. This step can comprise an authentication of the user 15. It can also comprise a verification (by the collection device 5 or the reading device 7) of the write entitlement of the user 15, as a function of the entitlements thus verified, and consequently the collection device 5 will or will not carry out the writing in its memory. This optional step can also comprise a construction of an integrity element associated with the data to be written. Furthermore, it can comprise an encryption of the data to be written, the encryption key being able to be tied to the identity of the user 15 or to the reading device 7. Finally the data are written, optionally with their integrity element, in the memory 29 of the collection device 5.

The communication with the collection device 5 can be effected according to two embodiments with a plurality of options for each of the embodiments.

Indeed, according to the first embodiment, the communication with the collection device 5, be it initiated by the aeronautical appliance 3 or by the reading device 7, is carried out in a direct manner, that is to say that it is not necessary for the initiator of the communication to authenticate itself and/or for its read and/or write entitlements to be verified in order that the communication with the collection device be established.

According to the second embodiment, the communication with the collection device 5, be it initiated by the aeronautical appliance 3 or by the reading device 7, requires a step of authenticating the initiator on the collection device 5. In this second embodiment, the collection device 5 comprises a complementary computation unit 27c (FIG. 2) which authenticates or accredits the entitlements of the initiator (aeronautical appliance 3 or reading device 7) that is seeking to communicate with the collection device 5. The accreditation of the entitlements is effected for example, by comparison with a database and verification of the authorization of a linkup between the source of the data item (aeronautical appliance 3, reading device 7 or user 15) and the memory of the collection device 5.

According to a first advantageous option, the method comprises a step of authentication of the user 15 on the reading device 7 by the complementary computation means 43b (FIG. 3).

According to a second advantageous option, the data communicated to the collection device 5, be they sent by the aeronautical appliance 3 or by the reading device 7, are encrypted by the sender (aeronautical appliance or reading device).

According to a third advantageous option, there is an integrity element (or signature) provided by the reading device 7 and by the aeronautical appliance 3 so as to validate the communication with the collection device 5. For example, the signature of the reading device 7 can be computed on the basis of the user 15 if the latter has authenticated himself or on the basis of the reading device 7 if there has not been any authentication of the user 15. The signing of the data communicated to the collection device 5 is in particular advantageous within the framework of the first embodiment, where the transmission of the data is carried out as plaintext.

According to a fourth advantageous option, the communication between the aeronautical appliance 3 and the collection device 5 is one-way in a direction going from the aeronautical appliance 3 to the collection device 5.

According to a fifth advantageous option, the method comprises a step of writing by the reading device 7, of tracking data relating to the maintenance of the aeronautical appliance in the memory 29 of the collection device 5.

Indeed, the collection device 5 can be of the "read and write" type and in this case, the user 15 can use the reading device 7 to read data which are recorded on the collection device 5 but also to write information on the collection device 5 relating mainly to maintenance actions carried out on the aeronautical appliance 3. Advantageously, the information relating to the maintenance activities undergone by the aeronautical appliance 3 are recorded on the collection device 5 in a secure manner so as to make them impossible to falsify.

The collection device 5 can as a variant be of the "read only" type and in this case, the user 15 can use the reading device solely to read data which are recorded on the collection device 5.

The data read in the collection device 5 can be utilized by diverse users (such as maintenance operator, airline, etc.). The distribution of the data is advantageously constrained by the entitlements allotted to these users, and can be supplemented with computerized signing means making it possible to ensure the integrity and the completeness of these data.

The utilization of the data allows the user, according to his entitlements, to have read access and, under certain conditions, write access, to certain information or to all this information. Thus, the method can in particular authorize or prohibit updates of the memory of the collection device 5, so as to comply with operational security constraints or computing security constraints.

The invention claimed is:

1. A method of writing, updating, and reading static and dynamic identification data for an aeronautical appliance comprising a computing unit, the method comprising:
    transmission by the aeronautical appliance to a collection device, of static and dynamic identification data for the aeronautical appliance, the collection device being integrated into the aeronautical appliance and coupled, by an isolation interface of the collection device, to the computing unit of the aeronautical appliance according to a master-slave communication model in which the computing unit is master of the communication with the collection device, wherein the isolation interface is configured to isolate a connection between the aeronautical appliance and the collection device from an exterior intrusion;
    storage of the static and dynamic identification data in a memory of the collection device;
    remote reading by a reading device of at least part of the static and dynamic identification data stored in the memory of the collection device; and
    managing, by a supervision circuit of the collection device, a conflict between simultaneous attempts to access the memory of the collection device, the simultaneous attempts including a first remote access attempt by the reading device and a second access attempt by the computing unit of the aeronautical appliance using the master-slave communication model and the isolation interface, wherein managing the conflict comprises resolving the conflict by automatically giving priority to the computing unit of the aeronautical appliance, and wherein managing the conflict comprises, in response to automatically giving priority to the computing unit of the aeronautical appliance, deactivating an energy harvesting circuit of the collection device while the computing unit of the aeronautical application is accessing the memory of the collection device.

2. The method according to claim 1, wherein a communication with the collection device, be it initiated by the aeronautical appliance or by the reading device, is carried out in a direct manner.

3. The method according to claim 1, wherein a communication with the collection device, be it initiated by the aeronautical appliance or by the reading device, requires authenticating the initiator.

4. The method according to claim 1, comprising authenticating the user on the reading device.

5. The method according to claim 1, wherein the communication between the aeronautical appliance and the collection device is one-way in a direction going from the aeronautical appliance to the collection device.

6. The method according to claim 1, comprising writing, by the reading device, of tracking data of the aeronautical appliance in the memory of the collection device.

7. The method according to claim 6, wherein the static and dynamic identification data transmitted to the collection device, be they sent by the aeronautical appliance or by the reading device, are encrypted and/or signed by the sender.

8. The method according to claim 1, comprising writing and reading, by the aeronautical appliance, of ancillary data of the life cycle of the aeronautical appliance in the memory of the collection device.

9. A system for writing, updating, and reading static and dynamic identification data for an aeronautical appliance comprising a computing unit, the system comprising:
    a collection device integrated into the aeronautical appliance and coupled to the computing unit of the aeronautical appliance according to a master-slave communication model in which the computing unit is master of the communication with the collection device, the collection device being configured to store static and dynamic identification data in a memory of the collection device, the collection device comprising an isolation interface configured to couple to the computing unit of the aeronautical appliance and configured to isolate a connection between the aeronautical appliance and the collection device from an exterior intrusion; and
    a reading device for remotely reading at least part of the identification data stored in the memory on the collection device;
    wherein the collection device comprises a supervision circuit configured to manage a conflict between simultaneous attempts to access the memory of the collection device, the simultaneous attempts including a first remote access attempt by the reading device and a second access attempt by the computing unit of the aeronautical appliance using the master-slave communication model and the isolation interface, wherein managing the conflict comprises resolving the conflict by automatically giving priority to the computing unit of the aeronautical appliance, and wherein managing the conflict comprises, in response to automatically giving priority to the computing unit of the aeronautical appliance, deactivating an energy harvesting circuit of the collection device while the computing unit of the aeronautical application is accessing the memory of the collection device.

10. A system according to claim 9, comprising:
first sender-receiver circuits configured to communicate remotely with the reading device;
the supervision circuit, which is configured to receive requests sent by the reading device via the first sender-receiver circuits or by the aeronautical appliance via the isolation interface, so as to manage accesses to the collection device by the reading device or the aeronautical appliance, and to ensure that the collection device cannot access the aeronautical appliance;
an execution circuit configured to execute the access requests originating from the supervision circuit; and
a memory accessible by the execution circuit and configured to store static and dynamic identification data for the aeronautical appliance.

11. A system according to claim 10, wherein the collection device comprises a complementary computation circuit configured to while in use authenticate requests of a user of the reading device and/or to encode data to be read and/or to be written in the memory.

12. A system according to claim 10, wherein the collection device comprises energy management circuits configured to power the various elements of the collection device either on the basis of energy transmitted by the reading device when the latter performs an access, or else on the basis of a power supply source provided by the aeronautical appliance when the latter performs an access.

13. A system according to claim 9, wherein the aeronautical appliance comprises a computing unit and comprises mechanical, electrical and communication interfaces.

14. A system according to claim 9, wherein the reading device comprises:
a user interface to allow a user to access part of the data stored on the collection device according to a profile of the user;
second sender-receiver circuits configured to communicate remotely with the collection device;
a control unit configured to send requests to the collection device via the second sender-receiver circuits and to manage the data received from the collection device;
a storage circuit configured to store data received from the collection device; and
power supply and energy management circuits configured to power the various elements of the reading device and to transmit energy to the collection device.

15. The method of claim 1, wherein the connection is implemented using an electro-optical coupling, and wherein the isolation interface comprises optocouplers.

16. The system of claim 9, wherein the connection is implemented using an electro-optical coupling, and wherein the isolation interface comprises optocouplers.

* * * * *